Sept. 1, 1936.                H. H. DICKSON                2,052,998
                            VISUALIZING DEVICE
                            Filed May 1, 1935
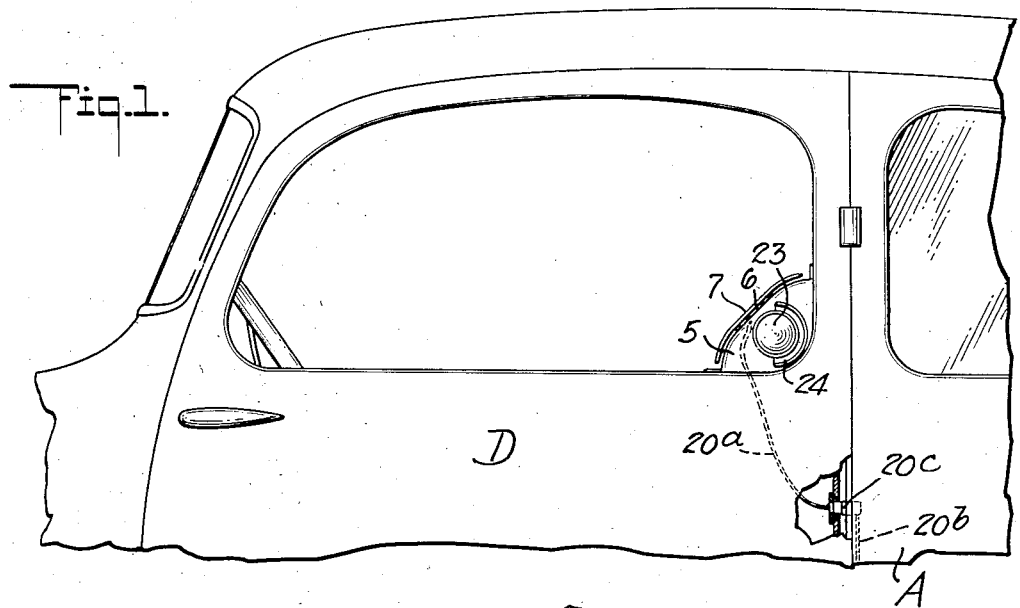
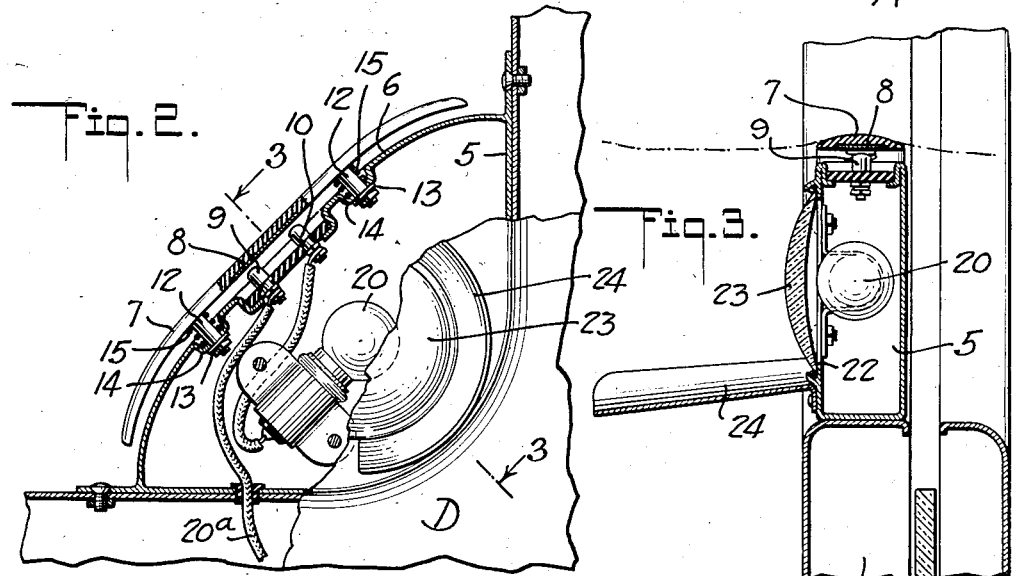
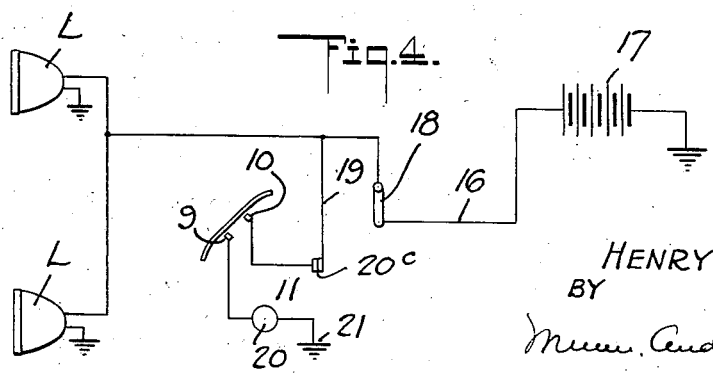
INVENTOR
HENRY H. DICKSON
BY
Munn, Anderson & Liddy
ATTORNEYS Patented Sept. 1, 1936

2,052,998

UNITED STATES PATENT OFFICE 2,052,998

VISUALIZING DEVICE

Henry H. Dickson, San Marino, Calif.

Application May 1, 1935, Serial No. 19,319

3 Claims. (Cl. 177—329)

This invention relates to warning devices and illuminating means and is primarily designed for use in connection with automobiles to give a visual indication of the intention of a driver to change the course of an automobile or to stop in traffic.

More specifically, the invention is directed to certain new and novel features in which means are embodied for causing the arm of a driver to be conspicuously illuminated during signalling movements of the arm from the window at the side of the driver's seat and thereby insure clear visibility of the arm when the signal to change the course or to stop is given.

An important feature of the invention is directed to the use of means in an illuminating circuit which will be actuated directly by the arm of the driver when the signal is given and thereby close the circuit and cause a beam of light to be projected laterally from an automobile at the driver's side to provide an illuminated field, the area of which will insure proper illumination of the arm during all signalling movements of the arm.

A further object is to provide a device of this character which can be readily installed in a car door window of any conventional form and disposed to be positively engaged and actuated by the arm of the driver.

Another object is to provide an electrically operated device of this character in which current can be supplied thereto from any conventional lighting circuit of an automobile in which the customary head and tail lights are arranged.

A further object of the invention is to provide an exceedingly simple form of device for the purpose stated in which current can be supplied thereto only when the conventional lighting circuit of the automobile is closed.

A further object is to provide a device in which current can be fed thereto from an ordinary lighting circuit without necessitating manual or any other control of the lighting circuit as and when it is intended to draw current from said circuit.

The invention consists substantially in the construction, combination, location and relative arrangement of parts, together with the novel methods engaged in accordance therewith, all as will be more fully hereinafter set forth, as shown by the accompanying drawing and fully pointed out in the appended claims.

Referring to the drawing:

Figure 1 is a view of a portion of an automobile showing an application of the invention thereto, a portion of the door being broken away and parts shown in section;

Figure 2 is a detail view partly in elevation and partly in section of the device applied to a portion of the door;

Figure 3 is a section on line 3—3 of Figure 2;

Figure 4 is a schematic illustration of the respective circuits employed.

In carrying the invention into practice, use is made of a signalling mechanism embodying a casing 5 of substantially triangular form to be received in the lower rear corner of the window opening of the left front door D of the automobile A as clearly shown in Figures 1 and 2. The mechanism is thus disposed in the direct path of signalling movement of the arm of the driver when indicating by the customary arm movements the course to be taken.

The casing 5 includes a diagonally disposed wall 6 and a correspondingly disposed circuit controlling member 7, the latter having a metallic bridging plate 8 which is normally yieldingly spaced apart from coacting contact devices 9 and 10 in a light projecting circuit 11, whereby to normally break said circuit. The member 7 is provided with guide studs 12 which are received in the guide openings 13 in the crown walls of depressed portions or cups 14 in the wall 6 of the casing 5 and surrounded by coil springs 15 which function to hold the member 7 in the full line position shown in Figure 2.

The automobile D is equipped with headlights L which are connected in a lighting circuit 16 in accordance with common practice, the circuit including a battery 17 for supplying direct current to the lamps of the head lights, and a switch 18, generally placed on the instrument board or on the steering wheel post for manually opening and closing the circuit as and when desired.

The circuit 11 is fed off of the circuit 16 through the lead 19 which runs to contact 10, and connected in circuit 11 is a lamp 20, one side of which connects with the contact 9 and the other side running to a ground 21. It therefore follows that when the switch 18 is closed to light the head lights, current can be drawn from the circuit 16 and supplied the circuit 11 and thereby light the lamp 20 when the plate 8 is manually advanced against the aforementioned contacts 9 and 10.

The casing 5 is provided with a lateral opening 22 behind which the lamp 20 is disposed, and mounted in said opening is a suitable lens 23 by means of which a beam of light will be projected along a path outside the window opening in door D to thus illuminate the arm of the driver when the arm is projected to a signalling position.

In back of the lens 23 and extending laterally from the casing 5 is a short length glare shield lamp 20 may be, and preferably is, formed to provide a light reflector which functions to concentrate the light to an effective field to insure intended illumination of the arm of the driver when signalling motions are being made. In order that the beam of light may be made additionally effective, the inner surface of the casing 5 behind the lamp 20 may be, and preferably is, formed to provide a light reflector by means of which the light beam can be projected a suitable distance laterally of the aforementioned door opening.

Many modifications and changes in details will occur to those skilled in the art without departing from the spirit and scope of my invention as defined in the claims, and I therefore desire to have the foregoing description and the illustrations used in connection therewith regarded in the illustrative sense rather than in a limiting sense. I especially would not expect to limit myself to the precise angular disposition of the arm actuated member 7 as this can be changed to suit varying requirements. I am broadly interested in the manner in which a circuit closing element such as member 7 can be disposed to reside in the effective path of signalling movements of the arm and for this reason it is proposed to vary the relationship of the parts to suit varying requirements.

In Figure 1 of the drawing, current may be supplied to the lamp 20 through conductors 20a and 20b having contact plates 20c at the hinge side of the door D and door frame, whereby, when the door is closed, the circuit 11 will be completed to the lamp. This is merely a means to enable the door to be opened and closed as usual. The arrangement is described in that it enables the circuit wires to be run through the body structure of the automobile. Any other arrangement can of course be resorted to if desired.

I claim:

1. In means for illuminating the arm of the driver of an automobile when extending the arm to a signaling position from the window opening next to the driver's seat, a substantially triangular casing adapted to be mounted in said opening at the lower rear corner thereof to dispose the top of the casing diagonally of said corner and in the path of signaling movement of the arm, said casing having a lens disposed to enable a beam of light to be projected along a path to illuminate the arm when the latter is in a signaling position; a lamp in said casing in back of said lens; a current supply circuit in which the lamp is connected; and a circuit closer for controlling the flow of current to the lamp by movement of the arm as aforestated and including a pair of contact devices in said circuit and a yieldingly mounted bridging element disposed parallel to said casing top for movement from an open to a closed circuit position relative to said contact devices when engaged by the arm of the driver.

2. The combination, with an automobile having a door provided with a substantially rectangular window opening through which the arm of the driver can be extended to a signaling position, of an electric lamp mounted in the door at said lower rear corner of said opening for casting a beam of light upon the arm when moved to a signaling position through said opening; a normally open circuit for supplying current to said lamp; and a circuit closer mounted in said lower rear corner of said opening and including a movable controlling member diagonally disposed across said corner and adapted to be engaged and moved by the arm when the latter is extended to any one of several possible signaling positions.

3. In means for illuminating the arm of the driver of an automobile when projecting the arm to a signaling position through the window opening of the door of the automobile next to the driver's seat; a casing adapted to be set into the lower rear corner of the opening and provided with a top disposed diagonally across said rear corner of said opening and therefore directly disposed in the path of signaling movement of the arm; an electric lamp disposed so as to illuminate the arm when the latter is in a signaling position and the lamp is lighted; said lamp adapted to be connected in a current supply circuit; and a circuit closer carried by said casing and including means mounted on said top of the casing, parallel thereto and adapted to be engaged by the arm when moving the latter as aforestated.

HENRY H. DICKSON.